United States Patent
Baek et al.

(10) Patent No.: US 11,163,705 B2
(45) Date of Patent: Nov. 2, 2021

(54) METHOD AND APPARATUS FOR PARTITIONING MEMORY BANDWIDTH OF SYSTEM

(71) Applicant: UNIST(ULSAN NATIONAL INSTITUTE OF SCIENCE AND TECHNOLOGY), Ulsan (KR)

(72) Inventors: Woongki Baek, Ulsan (KR); Jinsu Park, Ulsan (KR); Seongbeom Park, Ulsan (KR); Myeonggyun Han, Ulsan (KR); Jihoon Hyun, Ulsan (KR)

(73) Assignee: UNIST(ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 0 days.

(21) Appl. No.: 16/661,794

(22) Filed: Oct. 23, 2019

(65) Prior Publication Data
US 2020/0125507 A1    Apr. 23, 2020

(30) Foreign Application Priority Data
Oct. 23, 2018 (KR) ........................ 10-2018-0127057

(51) Int. Cl.
*G06F 13/16* (2006.01)
*G06F 9/50* (2006.01)
(52) U.S. Cl.
CPC ................ *G06F 13/1668* (2013.01)
(58) Field of Classification Search
CPC .............. G06F 3/0656; G06F 9/4881; G06F 13/1684
See application file for complete search history.

(56) References Cited

U.S. PATENT DOCUMENTS

| 7,409,568 | B2 | 8/2008 | Tam | |
|---|---|---|---|---|
| 7,673,113 | B2 | 3/2010 | Sugumar | |
| 8,705,527 | B1* | 4/2014 | Addepalli | H04W 48/02 370/389 |
| 2012/0069034 | A1* | 3/2012 | Biswas | G06F 13/1668 345/531 |
| 2012/0072678 | A1* | 3/2012 | Biswas | G06F 13/1684 711/154 |
| 2017/0109415 | A1* | 4/2017 | Sarkar | H04L 43/045 |
| 2018/0203723 | A1* | 7/2018 | Krueger | G06F 3/0656 |
| 2020/0104256 | A1* | 4/2020 | Xu | G06F 9/4881 |

FOREIGN PATENT DOCUMENTS

KR    20150038386    4/2015

* cited by examiner

*Primary Examiner* — Getente A Yimer
(74) *Attorney, Agent, or Firm* — Loginov & Associates. PLLC; William A Loginov (57) ABSTRACT

A method and apparatus for partitioning memory bandwidth of a system determines state combinations of techniques for partitioning the memory bandwidth of the system based on at least one application program executed on cores of the system, determines candidate state combinations corresponding to characteristics of the application program, among the state combinations, by profiling the application program based on the state combinations, selects a final state combination for the application program by exploring a state space of the system corresponding to the candidate state combinations, and partitions the memory bandwidth of the system based on the final state combination.

24 Claims, 8 Drawing Sheets

METHOD AND APPARATUS FOR PARTITIONING MEMORY BANDWIDTH OF SYSTEM

CROSS-REFERENCE TO RELATED APPLICATION(S)

This application claims the benefit of Korean Patent Application No. 10-2018-0127057, filed on Oct. 23, 2018, in the Korean Intellectual Property Office, the disclosure of which is incorporated herein by reference.

BACKGROUND

1. Field of the Invention

One or more example embodiments relate to a method and apparatus for partitioning memory bandwidth of a system.

2. Description of the Related Art

Memory bandwidth is a highly performance-critical shared resource on modern computer systems. To prevent the contention on memory bandwidth among the collocated workloads, memory bandwidth partitioning techniques have been investigated. It still remains unexplored to characterize the widely-used memory bandwidth partitioning techniques based on various metrics and investigate a hybrid technique that employs multiple memory bandwidth partitioning techniques to improve the overall efficiency.

PRIOR ART DOCUMENT

Patent Document

Patent Document 1: Korean Patent Application Publication No. 10-2015-0038386 (published on Apr. 8, 2015) proposes techniques for dynamic physical memory partitioning that may reallocate a physical memory shared between processing units.

SUMMARY

An aspect provides a hybrid technique that may dynamically partition memory bandwidth based on characteristics of an application program on a commodity server without requiring any offline profiling, based on a plurality of memory bandwidth partitioning techniques.

An aspect provides a hybrid technique that may present in-depth characterization of the widely used software (for example, thread packing (TP), and clock modulation (CM)) and hardware techniques (for example, memory bandwidth allocation (MBA)) for memory bandwidth partitioning in terms of dynamic range, granularity, and efficiency.

An aspect provides a hybrid technique that may achieve high efficiency and optimization of memory bandwidth partitioning by dynamically analyzing characteristics of target application programs, without requiring any per-application program offline data.

An aspect provides a hybrid technique by implementing a prototype of a hybrid technique for partitioning memory bandwidth, for example, as a user-level runtime system on Linux, requiring no modifications to the underlying operating systems.

According to an aspect, there is provided a method of partitioning memory bandwidth of a system, the method including determining state combinations of techniques for partitioning the memory bandwidth of the system based on at least one application program executed on cores of the system, determining candidate state combinations corresponding to characteristics of the application program, among the state combinations, by profiling the application program based on the state combinations, selecting a final state combination for the application program by exploring a state space of the system corresponding to the candidate state combinations, and partitioning the memory bandwidth of the system based on the final state combination.

The techniques may include at least one of thread packing (TP), clock modulation (CM), and memory bandwidth allocation (MBA).

The state combinations may include states respectively corresponding to the techniques, and a state combination which lowers a usage of the memory bandwidth of the system to be less than a preset standard.

The determining of the state combinations may include determining the state combinations based on a memory bandwidth budget for a predetermined application program.

The determining of the state combinations may include determining the state combinations for the number of the cores based on the memory bandwidth budget for the application program.

The determining of the state combinations may include determining the state combinations to set a duty cycle to a second level according to CM and set an allocated bandwidth to a first level according to MBA, for the number of the cores.

The determining of the candidate state combinations may include determining the candidate state combinations corresponding to the characteristics of the application program by removing a portion of the state combinations based on the profiling.

The determining of the candidate state combinations may include determining whether a performance degradation occurs when a core count allocated to the application program is not a divisor of a thread count of the application program according to TP, by dynamically profiling the application program based on the state combinations, and eliminating a state in which the core count allocated to the application program is not the divisor of the thread count of the application program from the state combinations, when the performance degradation occurs.

The determining of whether the performance degradation occurs may include profiling the application program in parallel by allocating the core count which is not the divisor of the thread count of the application program, and determining whether the performance degradation occurs based on a result of the profiling in parallel.

The selecting may include determining a final state of the system by comparing an efficiency of a previous state of the system and an efficiency of a current state of the system in the state space of the system, and selecting the final state combination based on a result of comparing the candidate state combinations in the previous state and the current state for the application program, based on the final state of the system.

The selecting may further include sorting the candidate state combinations, and the determining of the final state of the system may include determining the final state of the system by comparing the efficiency of the previous state of the system and the efficiency of the current state of the system in the state space of the system based on the sorted candidate state combinations.

The sorting may include sorting the candidate state combinations based on a computation capacity of the candidate state combinations.

The selecting of the final state combination may include generating a new state combination based on a result of comparing the candidate state combinations, and determining the new state combination to be the final state combination based on whether the new state combination satisfies the number of the cores of the system.

The selecting of the final state combination may include exploring the state space of the system periodically using a preset search algorithm, and selecting a candidate state combination satisfying a condition predesignated by a user for the application program from among the candidate state combinations, as the final state combination based on a result of the exploring.

The condition predesignated by the user may include whether a metric defined by the user is satisfied.

The method may further include monitoring at least one of a termination of the application program, and a memory bandwidth budget for an application program for executing the application program.

According to another aspect, there is provided an apparatus for partitioning memory bandwidth of a system, the apparatus including a memory, and a processor, wherein the processor may be configured to determine state combinations of techniques for partitioning the memory bandwidth of the system based on at least one application program executed on cores of the system, determine candidate state combinations corresponding to characteristics of the application program, among the state combinations, by profiling the application program based on the state combinations, select a final state combination for the application program by exploring a state space of the system corresponding to the candidate state combinations, and partition the memory bandwidth of the system based on the final state combination.

The techniques may include at least one of TP, CM, and MBA.

The state combinations may include states respectively corresponding to the techniques, and a state combination which lowers a usage of the memory bandwidth of the system to be less than a preset standard.

The processor may be configured to determine the state combinations based on a memory bandwidth budget for a predetermined application program.

The processor may be configured to determine the state combinations for the number of the cores based on the memory bandwidth budget for the application program.

The processor may be configured to determine the state combinations to set a duty cycle to a second level according to CM and set an allocated bandwidth to a first level according to MBA, for the number of the cores.

The processor may be configured to determine the candidate state combinations corresponding to the characteristics of the application program by removing a portion of the state combinations based on the profiling.

The processor may be configured to determine whether a performance degradation occurs when a core count allocated to the application program is not a divisor of a thread count of the application program according to TP, by dynamically profiling the application program based on the state combinations, and eliminate a state in which the core count allocated to the application program is not the divisor of the thread count of the application program from the state combinations, when the performance degradation occurs.

The processor may be configured to profile the application program in parallel by allocating the core count which is not the divisor of the thread count of the application program, and determine whether the performance degradation occurs based on a result of the profiling in parallel.

The processor may be configured to sort the candidate state combinations, determine a final state of the system by comparing an efficiency of a previous state of the system and an efficiency of a current state of the system in the state space of the system based on the sorted candidate state combinations, and select the final state combination based on a result of comparing the candidate state combinations in the previous state and the current state for the application program, based on the final state of the system.

The processor may be configured to sort the candidate state combinations based on a computation capacity of the candidate state combinations.

The processor may be configured to generate a new state combination based on a result of comparing the candidate state combinations, and determine the new state combination to be the final state combination based on whether the new state combination satisfies the number of the cores of the system.

The processor may be configured to explore the state space of the system periodically using a preset search algorithm, and select a candidate state combination satisfying a condition predesignated by a user for the application program from among the candidate state combinations, as the final state combination based on a result of the exploring, and the condition predesignated by the user may include whether a metric defined by the user is satisfied.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 1:
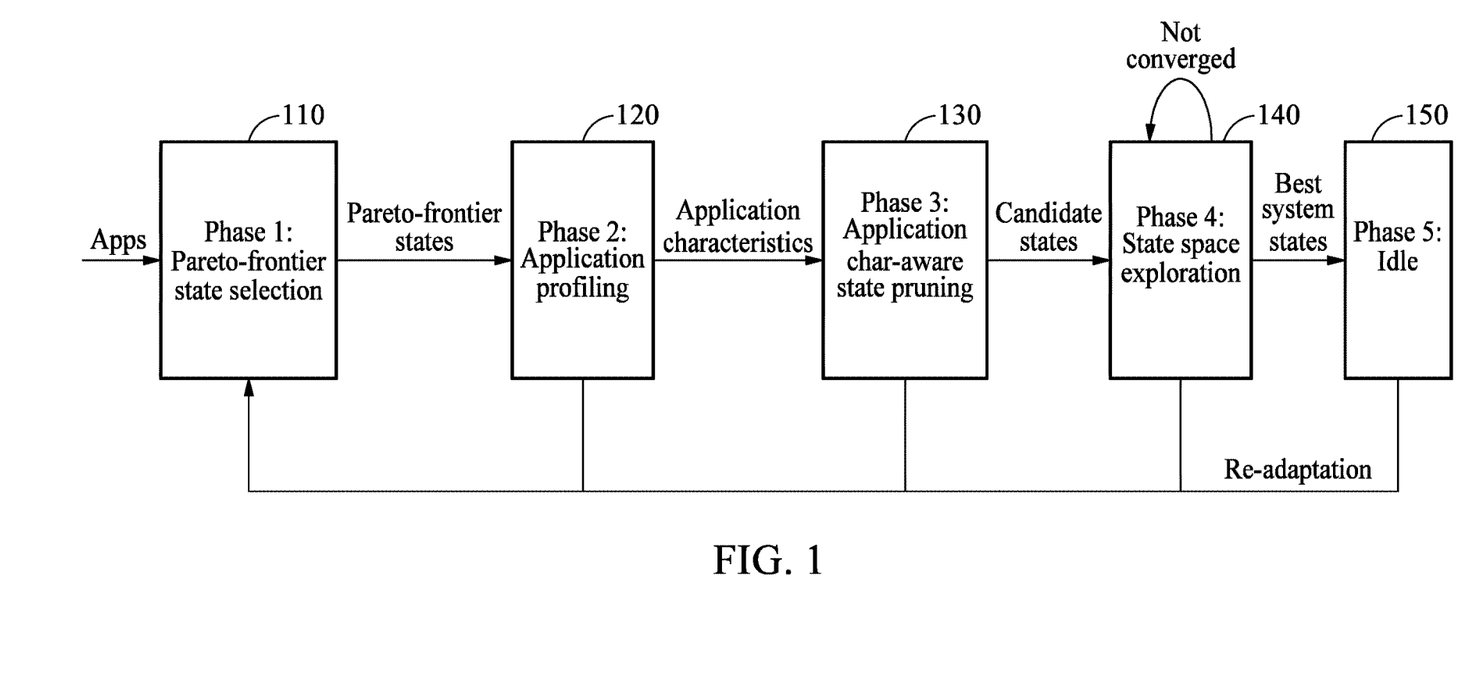
FIG. 1 is a diagram illustrating an operation flow of an apparatus for partitioning memory bandwidth of a system according to an example embodiment.

FIG. 1 is a diagram illustrating an operation flow of an apparatus for partitioning memory bandwidth of a system according to an example embodiment. Referring to FIG. 1, an overall execution flow of an apparatus for partitioning memory bandwidth of a system (hereinafter, the "partitioning apparatus") is illustrated.

The partitioning apparatus may determine an optimal system state which maximizes a user-defined efficiency metric through a Pareto-frontier state selection phase 110, an application program profiling phase 120, an application program characteristic-aware state pruning phase 130, a state space exploration phase 140, and an idle phase 150 shown in FIG. 1.

The partitioning apparatus may configure a state of each application program by maximizing the user-defined efficiency metric. A method of partitioning memory bandwidth of a system performed by the partitioning apparatus is a "hybrid memory bandwidth partitioning technique" or simply a "hybrid partitioning technique" in that it employs three memory bandwidth partitioning techniques, for example, thread packing (TP), clock modulation (CM), and memory bandwidth allocation (MBA), in a coordinated manner.

TP is a technique for controlling a memory traffic by dynamically adjusting concurrency levels of target application programs.

CM is a technique for specifying the percentage of duty cycles in advance such that a core or a processor may operate during a clock cycle corresponding to a duty cycle to control a memory traffic. CM settings may be, for example, from a level 1 to a level 10 When the level increases, the percentage of duty cycles may increase.

MBA is a technique for controlling a memory traffic by a per-core mechanism in that it throttles the outgoing traffic from an L2 cache to a last level cache (LLC) of a L3 cache for a core or a processor. MBA settings may be, for example, from a level 1 to a level 10. When the level increases, the percentage of a memory bandwidth budget allocated to an application program in the entire memory bandwidth of the system may increase.

The partitioning apparatus may optimize the state of the system by dynamically pruning inefficient states based on characteristics of target application programs which are dynamically analyzed at runtime. For example, it may be assumed that there are $N_C$ cores or processors on a target system and $N_A$ application programs to be executed. Here, $N_A \leq N_C$.

A state of an application program i ($i \in [0, {}_{NA-1}]$) may be indicated as $s_i$, and $s_i$ may be defined as ($c_i$, $d_i$, $m_i$), for example. Here, $c_i$ may denote a core count allocated to the application program i, and $d_i$ may denote a value of setting of CM (for example, the percentage of duty cycles). $m_i$ may denote a value of setting of MBA.

Examples of state(s) of an application program will be described in detail below with reference to FIG. 2.

The total core count allocated to all the application programs must be equal to or less than the total core count $N_C$ of the target system, and sharing of cores between application programs is disallowed. In this example, the system state S may be defined as $S = \{s_0, s_1, \ldots, s_{NA-1}\}$.

The partitioning apparatus may aim at finding an optimal system state (that is, Sops). The partitioning apparatus may find the optimal system state, for example, using an overall throughput metric defined in Equation 1.

$$\text{Throughput} = \sqrt[N_A]{\prod_{i=0}^{N_A-1} IPS_i} \qquad \text{[Equation 1]}$$

(Here, IPS denotes the number of instructions processed per second. i denotes the application program executed on the target system, and $N_A$ denotes the number of application programs executed on the target system.)

The partitioning apparatus may also optimize the state of the system based on metrics (for example, fairness) other than the user-defined efficiency metric as in Equation 1. Hereinafter, an operation performed by the partitioning apparatus to find an optimal system state will be described.

During the Pareto-frontier state selection phase 110, the partitioning apparatus may reduce a system state space by determining state combinations by pruning states for each application program. Here, the term "Pareto-frontier state" may refer to a state which maximizes the efficiency of the system through combination of provided states.

The key idea of the Pareto-frontier state selection phase 110 is that the system achieves the best performance by setting a level for duty cycle to the highest CM setting and setting an allocated bandwidth to the lowest MBA setting when the number of core(s) to drive the application program is fixed through characteristics of the application program.

Therefore, the partitioning apparatus may determine the Pareto-frontier state for each core count and prune all the other states.

The characteristics of target application programs may include, for example, dynamic range, granularity, performance, performance anomalies of TP, and Pareto-frontier state. The characteristics of the target application programs will be described further below. Hereinafter, characteristics of an application program may be construed as performance characteristics.

Dynamic Range

The partitioning apparatus may investigate the dynamic range of the three memory bandwidth partitioning techniques, thereby defining the dynamic range of the memory bandwidth partitioning techniques as the width and the range between the minimum and maximum bandwidths that may be configured using the corresponding partitioning technique.

To determine the dynamic range of the three memory bandwidth partitioning techniques, the STREAM benchmark may be used. The partitioning apparatus may determine the dynamic range by sweeping the performance of the corresponding memory bandwidth partitioning technique from the minimum level to the maximum level while the performances of the other memory bandwidth partitioning techniques are set to their maximum levels. The following Table 1 summarizes the aggregate data of the three memory bandwidth partitioning techniques with respect to the dynamic range and the granularity.

TABLE 1

| Partitioning Techniques | Dynamic Range (GB/s) | Granularity (GB/s) |
| --- | --- | --- |
| Thread packing | 9.51-56.16 | 3.11 |
| Clock modulation | 9.75-56.16 | 3.32 |
| MBA | 34.20-56.16 | 5.47 |

First, TP and CM provide wide dynamic ranges. Specifically, the dynamic ranges of TP and CM are 9.51 GB/s to 56.16 GB/s and 9.75 GB/s to 56.16 GB/s, which are similar.

This is mainly because the differences between the minimum (that is, 6.25% for TP and 12.5% for CM) and maximum (100% for TP and CM) levels of TP and CM are large.

Second, the dynamic rage (that is, 34.20 GB/s to 56.16 GB/s) of MBA is significantly narrower than those of the other two techniques. This is mainly because the bandwidth of the interconnection network between the level 2 (L2) cache and LLC is much higher than that of the main memory. Therefore, unless a very long delay (for example, MBA settings of 10% or 20%) between the L2 cache and LLC is injected, MBA has little or no effects on throttling memory bandwidth.

Granularity

The granularity of a memory bandwidth partitioning technique may be defined as an average of the memory bandwidth differences of the consecutive levels of the corresponding partitioning technique. As shown in Table 1, TP and CM may provide a fine-grain control of memory bandwidth. The average granularity of TP and CM may be, for example, 3.11 GB/s and 3.32 GB/s. This is mainly because TP and CM provide a relatively large number (that is, 16 for TP and 15 for CM) of settings, and each of the settings effectively incurs widely-different memory bandwidth.

In contrast, MBA provides a coarse-grain control of memory bandwidth. This is mainly because MBA provides the memory bandwidth control only when its setting is set to relatively small values (that is, from 10% to 30%). The delay injected to each outgoing request by MBA may be proportional to the MBA setting value.

Therefore, the differences in the delays injected with two small consecutive MBA settings (for example, 10% and 20%) are significantly larger than the differences in the delays injected with two large consecutive MBA settings (for example, 70% and 80%), which results in a coarse-grain control of memory bandwidth.

Results of the analysis of the performance characteristics of the three memory bandwidth partitioning techniques may be summarized as follows. In terms of dynamic range and granularity, TP and CM may provide a significantly wider dynamic range and a finer-grain granularity than MBA.

Performance

MBA incurs lower performance degradation than TP and CM because MBA only affects the stalled cycles due to L2 cache and LLC misses. In contrast, TP and CM incur the increased cycles that are proportional to the entire execution cycles, which may lead to higher performance degradation.

In case of performance anomalies of TP, TP may cause significant performance degradation when the core count allocated to the application program is not a divisor of the thread count of the corresponding application program. Application programs may show higher tolerance against the performance anomalies of TP if they do not perform thread synchronization or employ no or coarse-grain synchronization techniques.

In case of the Pareto-frontier state, a state with the highest CM setting (or a second level) and the lowest MBA setting (or a first level) at the same core count and memory bandwidth budget may achieve the best performance. This is mainly because the performance degradation caused by MBA is significantly lower than CM.

Overall, the characterization results clearly motivate the need for a hybrid memory bandwidth partitioning technique because none of the three memory bandwidth partitioning techniques outperforms the others in terms of dynamic range, granularity, and efficiency. Further, the memory bandwidth partitioning technique must be aware of the characteristics of the target application programs because some states constructed by combining the three memory bandwidth partitioning techniques are highly inefficient for certain application programs and bandwidth budgets.

State combinations corresponding to each application program may be constructed or determined by maximizing the user-defined efficiency metric through the hybrid partitioning technique which employs the three memory bandwidth partitioning techniques in a coordinated manner. The phase 110 described above may correspond to operation 310 which will be described later with reference to FIG. 3.

During the application program profiling phase 120, the partitioning apparatus may profile each of the target applications dynamically or in parallel in order to determine its tolerance to the performance anomalies of TP when the core count allocated to the application program is not a divisor of the thread count. That is, when a state in which the core count allocated to the application program and the used thread count do not satisfy the divisor relationship and the performance degradation of the system caused by the state is great, the phase 120 may be a process of removing the corresponding state.

The partitioning apparatus may measure the portion of the Idle cycles (that is, the "valid period" out of the total cycles for a short period at runtime by setting the core count allocated to the application program to a value that is not a divisor of the thread count. The partitioning apparatus may determine that the target application program is tolerable against the performance anomalies of TP, if the portion of the Idle cycles is below a threshold, which is configurable.

The application program characteristic-aware state pruning phase 130 may correspond to a process of eliminating the states in which the core count allocated to the application program is not a divisor of the thread count of the corresponding application program if the target application program is classified to be intolerant against the performance anomalies of TP. The key idea of this phase is to find the optimal system state and reduce the time required to converge to the optimal system state by eliminating state combination(s) from the application programs that are intolerant against the performance anomalies of TP. The phases 120 and 130 described above may correspond to operation 320 which will be described later with reference to FIG. 3.

The state space exploration phase 140 may correspond to a process of dynamically exploring the system state space using a preset search algorithm and finding a system state that achieves high efficiency in terms of the user-defined efficiency metric. In the state space exploration phase 140, the partitioning apparatus may explore a new system state. For example, if the efficiency of the current state of the currently-explored system is higher than that of the previous state, the partitioning apparatus may continue to explore a new system state. Further, if the efficiency of the current state of the currently-explored system is lower than or equal to that of the previous state, the partitioning apparatus may roll back to the previous system state and generate a new system state to explore.

At each adaptation period, the partitioning apparatus may remove the explored inefficient states or state combinations to reduce the search space to explore. The partitioning apparatus may repeat the state space exploration phase until all the system states are explored or the rollback count exceeds a predetermined threshold (for example, "10"). An example of exploring the state space by the partitioning apparatus will be described in detail with reference to FIG. 6. The state space exploration phase 140 described above may correspond to operation 330 which will be described later with reference to FIG. 3.

The idle phase 150 may correspond to a process of the partitioning apparatus keeping monitoring the target system and application programs. If a state change of the system and/or the application (for example, the termination of an application or a change in memory bandwidth budgets for application programs) is detected, the partitioning apparatus may terminate the idle phase and re-trigger the adaptation process of the phases 110 through 140.

Figure 2:
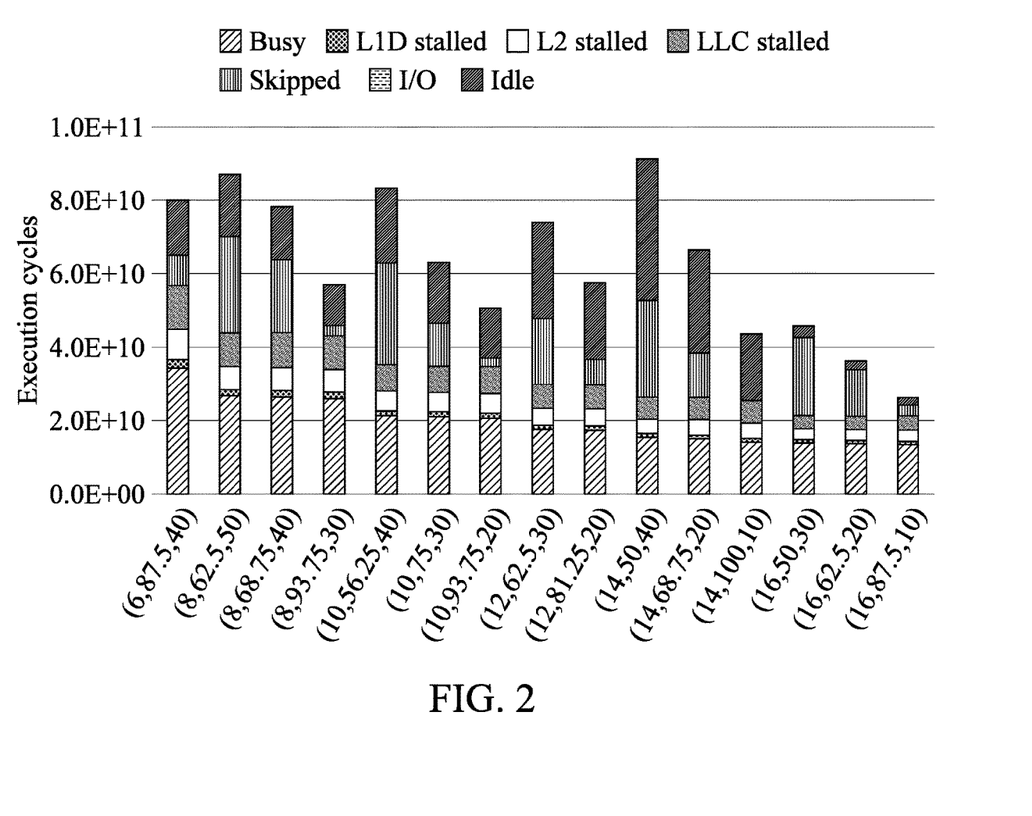
FIG. 2 is a graph illustrating the performance of state combinations according to an example embodiment.

FIG. 2 is a graph illustrating the performance of state combinations according to an example embodiment. Referring to FIG. 2, the performance of techniques for partitioning memory bandwidth of a system with respect to various state combinations when memory bandwidth budgets for application programs are set to 30 GB/s.

In FIG. 2, each bar includes cycles spent for other than stalled cycles due to cache misses ("Busy"), cycles spent for L1 data cache misses ("L1D Stalled"), cycles spent for L2 cache misses ("L2 Stalled"), cycles spent for LLC misses ("L3 Stalled"), skipped cycles due to CM ("Skipped"), idle cycles due to I/O operations ("I/O"), and idle cycles due to imbalances ("Idle").

For example, when a state of an application program i is set to (16, 50, 30), it may be indicated that a core count allocated to the application program i according to TP is "16", and a duty cycle for the application program i according to CM is 50%, and the MBA setting with respect to the application program i is 30%.

The performance by state combinations may be evaluated as follows.

For example, in the graph of FIG. 2, when the state is set to (14, 12.5, 40), the performance of the system may deteriorate because of the significant increase in the Idle time, which is caused by the imbalances in the resources allocated across the threads. With TP, more threads may be packed on cores than the others when the allocated core count is not a divisor of the thread count. The threads that are packed on the more-loaded cores receive less resources than the others, and make the other threads wait at synchronization points, which may significantly degrade the overall performance of the system.

Figure 3:
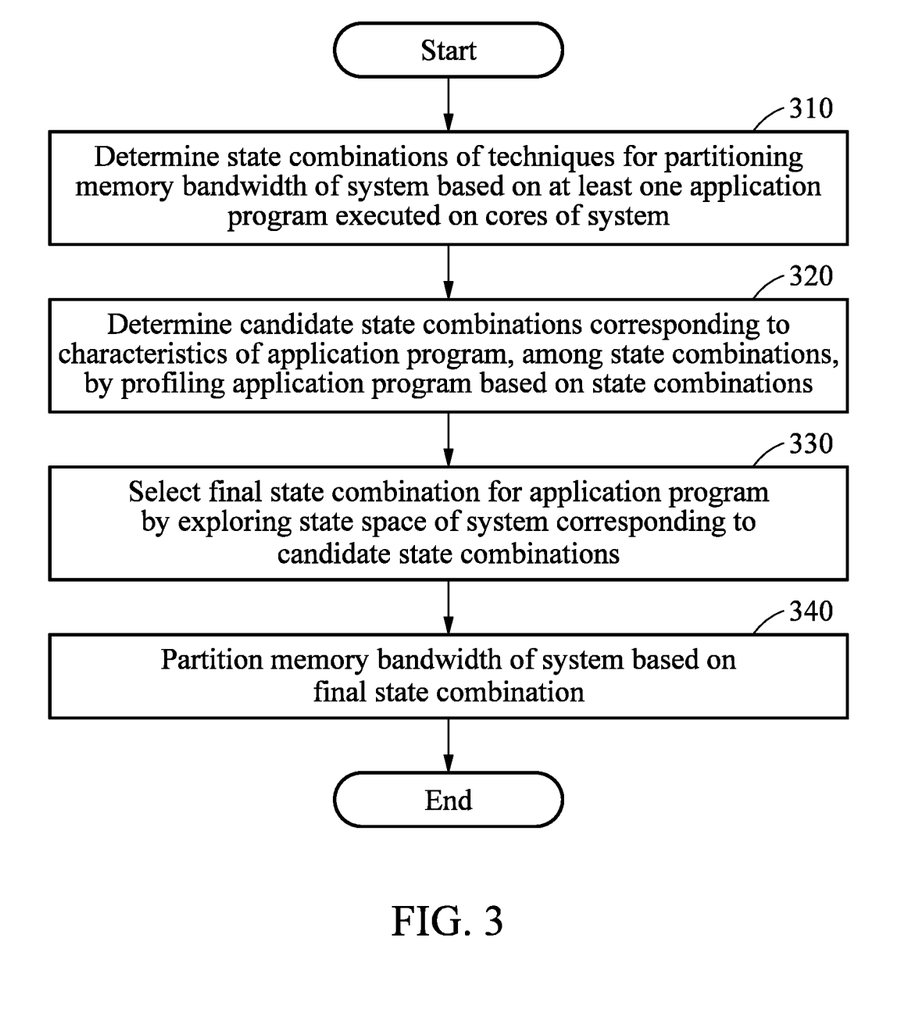
FIG. 3 is a flowchart illustrating a method of partitioning memory bandwidth of a system according to an example embodiment.

FIG. 3 is a flowchart illustrating a method of partitioning memory bandwidth of a system according to an example embodiment. Referring to FIG. 3, in operation 310, a partitioning apparatus may determine state combinations of techniques for partitioning memory bandwidth of a system based on at least one application program executed on cores of the system. The techniques for partitioning memory bandwidth of a system may include, for example, TP, CM, and MBA. Here, "partitioning memory bandwidth of a system" may be construed as allocating memory bandwidth of a system to application programs. The state combinations may include states respectively corresponding to the partitioning techniques described above, and a state combination which lowers a usage of the memory bandwidth of the system to be less than a preset standard.

In operation 310, the partitioning apparatus may determine the state combinations based on a memory bandwidth budget for a predetermined application program. An example in which the partitioning apparatus determines the state combinations will be described further below with reference to FIG. 4.

In operation 320, the partitioning apparatus may determine candidate state combinations corresponding to characteristics of the application program, among the state combinations, by profiling the application program based on the state combinations. The partitioning apparatus may determine the candidate state combinations corresponding to the characteristics of the application program by removing a portion of the state combinations (for example, a state in which a core count allocated to the application program is not a divisor of a thread count of the application program) from the state combinations based on the profiling. An example in which the partitioning apparatus determines the candidate state combinations will be described further below with reference to FIG. 5.

In operation 330, the partitioning apparatus may select a final state combination for the application program by exploring a state space of the system corresponding to the candidate state combinations. The partitioning apparatus may explore the state space of the system periodically, for example, using a preset search algorithm. The partitioning apparatus may select a candidate state combination satisfying a condition predesignated by a user for the application program from among the candidate state combinations, as the final state combination based on a result of the exploring. Here, the condition predesignated by the user may include whether a metric defined by the user is satisfied based on the number of instructions processed by cores per second. The condition predesignated by the user may be, for example, Equation 1 described above. An example in which the partitioning apparatus selects the final state combination will be described further below with reference to FIGS. 6 through 8.

In operation 340, the partitioning apparatus may partition the memory bandwidth of the system based on the final state combination. The partitioning apparatus may monitor, for example, at least one of a termination of the application program, and a memory bandwidth budget for an application program for executing the application program. As a result of the monitoring, in response to a termination of the corresponding application program, or in response to a change in the memory bandwidth budget for the application program for executing the application program, the partitioning apparatus may newly determine a final state combination by repeating the process of operations 310 through 330 described above.

Figure 4:
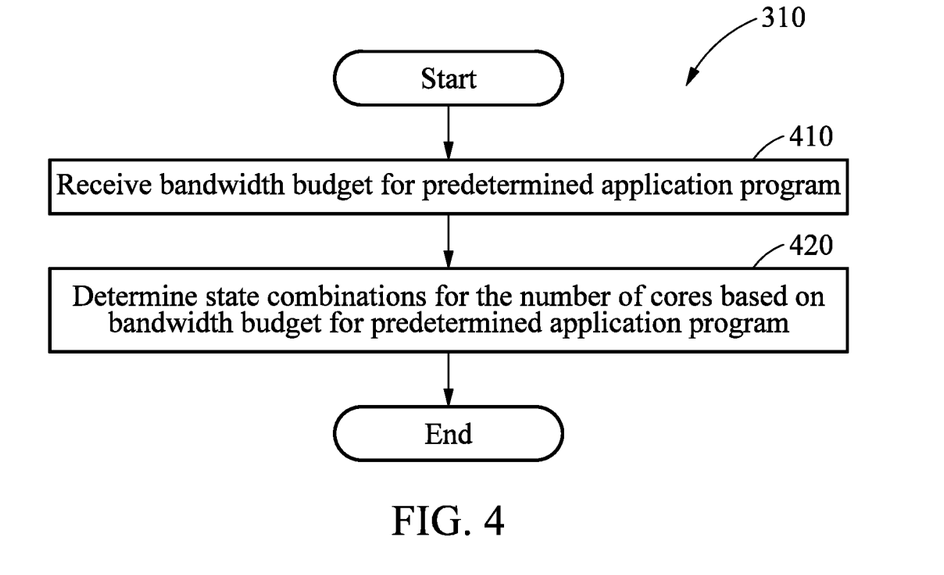
FIG. 4 is a flowchart illustrating an example of determining state combinations of techniques for partitioning memory bandwidth of a system according to an example embodiment.

FIG. 4 is a flowchart illustrating an example of determining state combinations of techniques for partitioning memory bandwidth of a system according to an example embodiment. Referring to FIG. 4, in operation 410, the partitioning apparatus may receive a memory bandwidth budget for an application program.

In operation 420, the partitioning apparatus may determine state combinations for the number of cores based on the memory bandwidth budget for the application program. For example, the partitioning apparatus may determine the state combinations to set a duty cycle to a second level (or the maximum level) according to CM and set an allocated bandwidth to a first level (or the minimum level) according to MBA, for the number of the cores.

Figure 5:
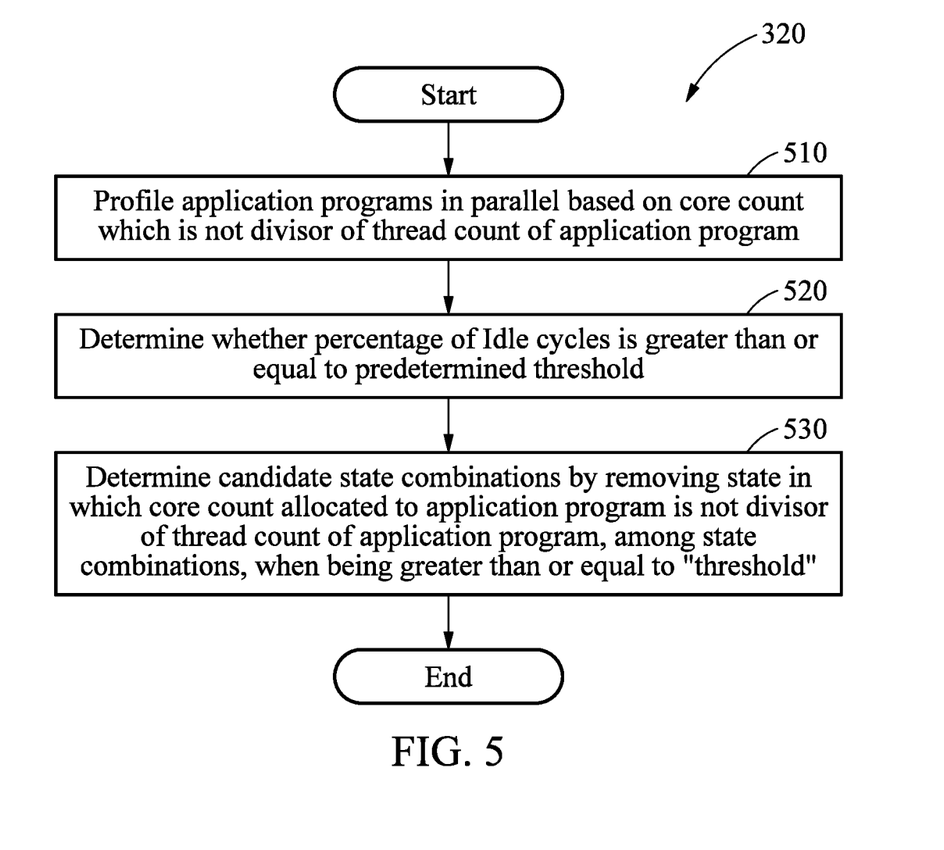
FIG. 5 is a flowchart illustrating an example of determining candidate state combinations according to an example embodiment.

FIG. 5 is a flowchart illustrating an example of determining candidate state combinations according to an example embodiment. Referring to FIG. 5, in operation 510, the partitioning apparatus may profile the application programs in parallel based on the core count which is not the divisor of the thread count of the application program.

In operation 520, the partitioning apparatus may determine whether the percentage of Idle cycles is greater than or equal to a predetermined threshold.

In operation 530, the partitioning apparatus may determine the candidate state combinations by removing a state in which a core count allocated to the application program is not a divisor of a thread count of the application program from the state combinations, when the percentage of the Idle cycles is greater than or equal to the predetermined threshold.

The partitioning apparatus may perform profiling with respect to a state having a core count which is not the divisor of the thread count, among the state combinations, rather than performing profiling only when the core count is not the divisor of the thread count.

Figure 6:
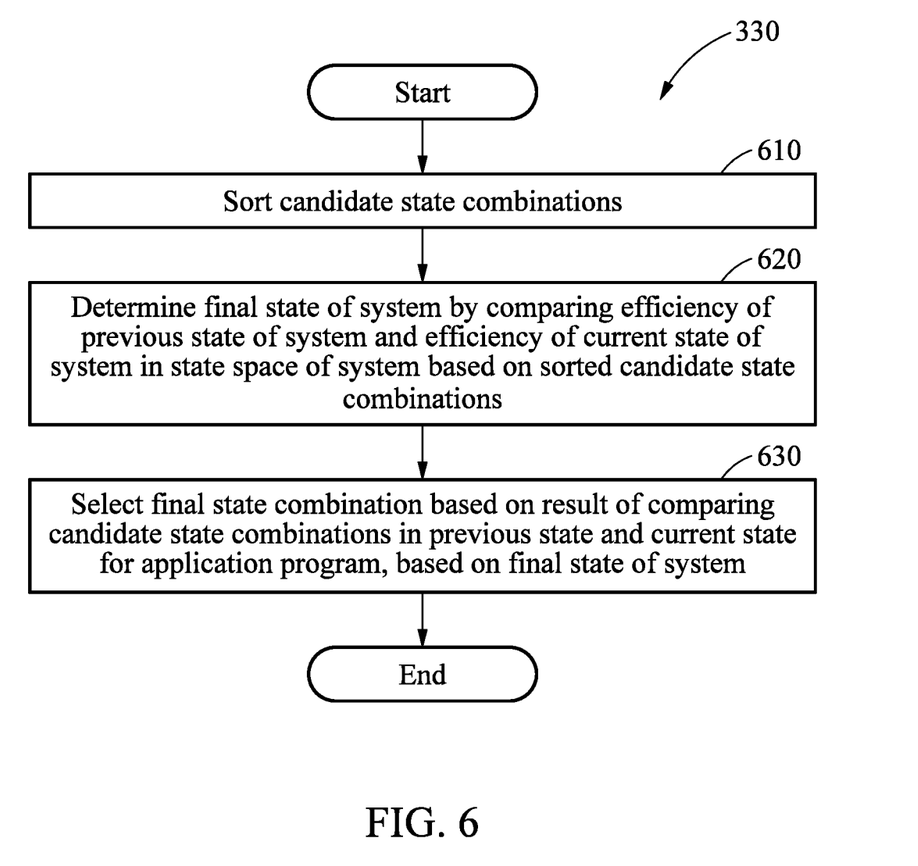
FIG. 6 is a flowchart illustrating an example of selecting a final state combination according to an example embodiment.

FIG. 6 is a flowchart illustrating an example of selecting a final state combination according to an example embodiment. Referring to FIG. 6, in operation 610, the partitioning apparatus may sort the candidate state combinations. For example, the partitioning apparatus may sort the candidate state combinations based on a computation capacity of the candidate state combinations. Here, the computation capacity may be expressed by the product of a TP parameter and a CM parameter. For example, when a state is set to (8, 93.75, 30), the computation capacity may be calculated as expressed by TP parameter (8)×CM parameter (93.75(%))= 7.5. The partitioning apparatus may sort the candidate state combinations in the order of great computation capacity.

In operation 620, the partitioning apparatus may determine the final state of the system by comparing an efficiency of a previous state of the system and an efficiency of a current state of the system in the state space of the system based on the sorted candidate state combinations.

In operation 630, the partitioning apparatus may select the final state combination based on a result of comparing the candidate state combinations in the previous state and the current state for the application program, based on the final state of the system. For example, the partitioning apparatus may generate a new state combination based on a result of comparing the candidate state combinations. The partitioning apparatus may determine the new state combination to be the final state combination based on whether the new state combination satisfies the number of the cores of the system. An example in which the partitioning apparatus selects the final state combination by exploring the state space of the system will be described further below with reference to FIG. 7.

Figure 7:
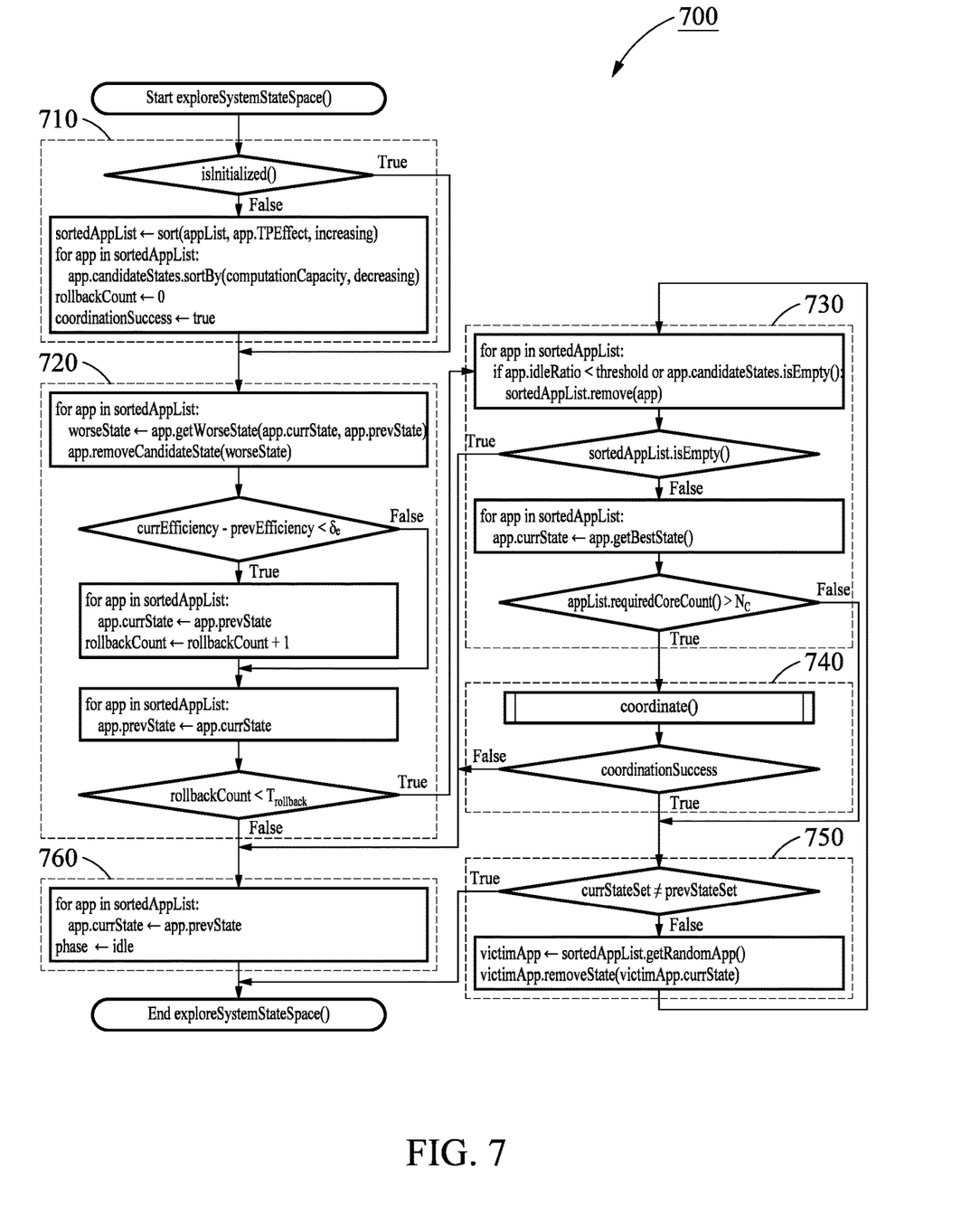
FIG. 7 is a flowchart illustrating an example of exploring a state space according to an example embodiment.

FIG. 7 is a flowchart illustrating an example of exploring a state space according to an example embodiment. Program coding of FIG. 7 may include six sub-phases, in detail, an initialization sub-phase 710, an efficiency evaluation sub-phase 720, a system state generation sub-phase 730, a coordination sub-phase 740, a duplicated system state elimination sub-phase 750, and an exit sub-phase 760.

During the initialization sub-phase 710, the partitioning apparatus may initialize key data (or data structures) that are required for the entire state space exploration phases. In this example, all the application programs may be sorted with respect to their tolerance to the performance anomalies to TP. The candidate state combinations of each application program may be sorted in the order of their computation capacity (the product of the TP and CM parameters). Since the candidate state combinations provide similar memory bandwidth, the partitioning apparatus may sort candidate state combinations with larger computation capacity with higher priority. The initialization sub-phase 710 may be executed only once for given application programs (or a given set of application programs).

During the efficiency evaluation sub-phase 720, the partitioning apparatus may compare (or evaluate) the efficiency of previous and current states of the system in the state pace of the system, and accordingly perform the necessary actions based on a result of the comparing (or evaluating). The partitioning apparatus may perform the efficiency evaluation in the individual application program and system levels.

In the efficiency evaluation sub-phase 720, the partitioning apparatus may remove a state that exhibits a lower efficiency from a candidate state list of the application program based on the performance data of each application program with the previous and current states. In this example, the candidate state list may include a plurality of candidate state combinations. This is to reduce the search space of the system and ensure the faster convergence to an efficient system state.

Further, in the efficiency evaluation sub-phase 720, the partitioning apparatus may evaluate the overall efficiency across the application programs with the previous and current states of the system. For example, if the efficiency of the current state of the system is lower than that of the previous system of the system, the partitioning apparatus may roll back to the previous state of the system. Here, to "roll back" may refer to returning to an immediately previous state.

For example, if the rollback count is less than or equal to a predefined threshold, the partitioning apparatus may perform the system state generation sub-phase 730. If the rollback count exceeds the predefined threshold, the partitioning apparatus may perform the exit sub-phase 760.

During the system state generation sub-phase 730, the partitioning apparatus may generate a new state of the system if the rollback count is lower than the predefined threshold or the efficiency of the current state of the system is higher than that of the previous system state. The partitioning apparatus may generate the new state combination to explore by combining the best state of each application program. The partitioning apparatus may determine a validity of the newly generated state combination by checking if the total core count requested by the new state combination is less than or equal to the total core count of the system. For example, if the total core count requested by the new state combination is less than or equal to the total count $N_C$ of the system, the partitioning apparatus may perform the duplicated system state elimination sub-phase 750.

The coordination sub-phase 740 may be performed if the total core count requested by the new state combination generated in the system state generation sub-phase 730 is greater than the total core count $N_C$ of the system. The coordination sub-phase 740 will be described further below with reference to FIG. 8.

The duplicated system state elimination sub-phase 750 may be performed if the coordination sub-phase 740 succeeds the coordination or the total core count requested by the new state combination generated in the system state generation sub-phase 730 is less than or equal to the total core count $N_C$ of the system.

In the duplicated system state elimination sub-phase 750, the partitioning apparatus may check if the newly generated state combination is same as the previously explored system state combination. For example, if the newly generated state combination is the same as the previously explored system state combination, there is a possibility that the partitioning apparatus may be indefinitely stuck at the same system state. To prevent this possibility, the partitioning apparatus may randomly select a state among the newly generated state combinations of the system, and remove the selected state from the candidate state list of the corresponding application program. This may essentially eliminate the newly-generated state of the system from the candidate state combinations. Then, the partitioning apparatus may generate the new system state to explore in the system state generation sub-phase 730. In the duplicated system state elimination sub-phase 750, the partitioning apparatus may perform the exit sub-phase 760 if the newly generated state combination is not the same as the previously explored system state combination.

The exit sub-phase 760 may be performed if there is no more system state to be explored by the partitioning apparatus, or when the rollback count exceeds the predefined threshold.

Figure 8:
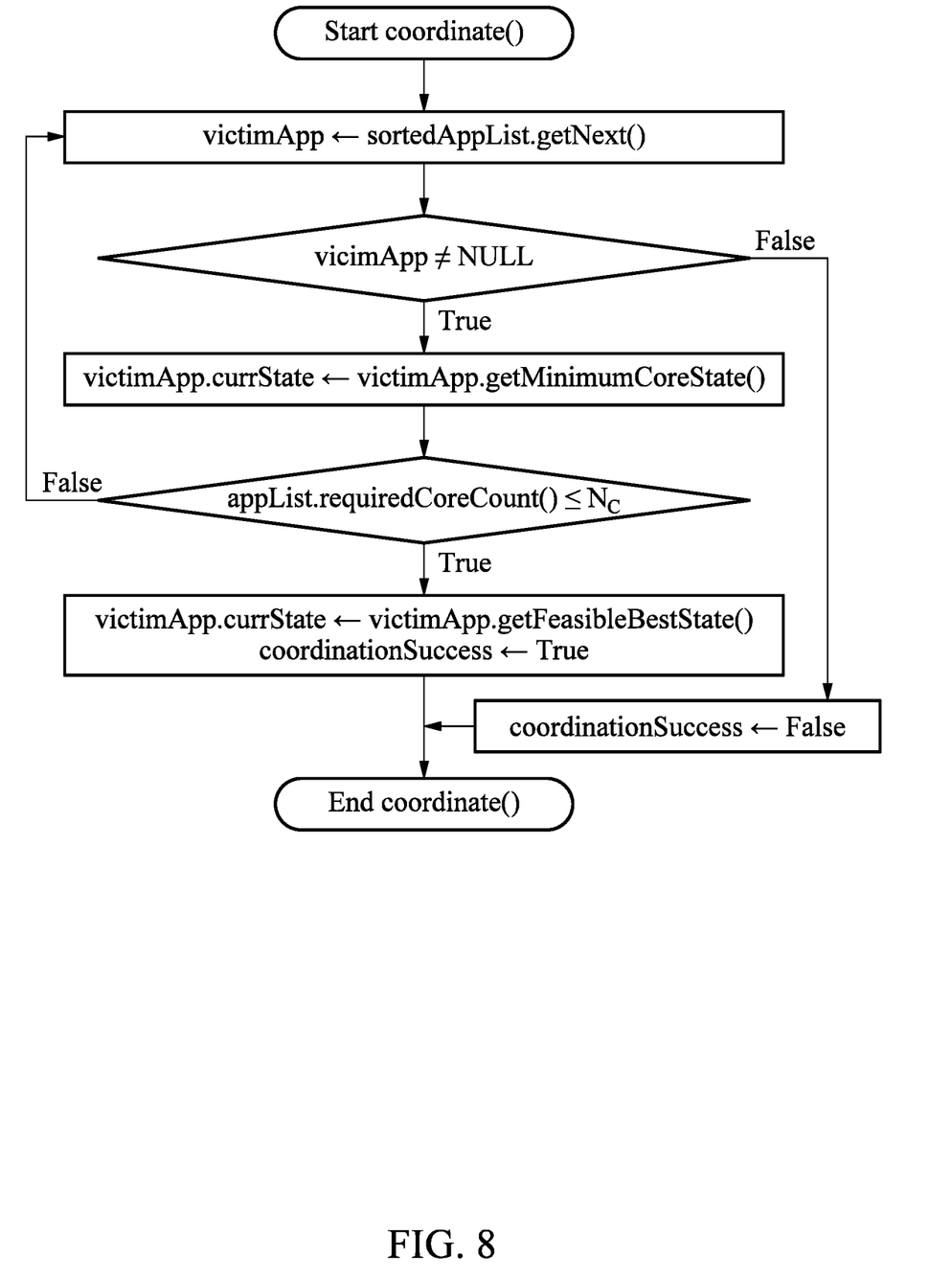
FIG. 8 is a flowchart illustrating an operation of a coordinate function performed during a process of selecting a final state combination for an application program according to an example embodiment.

FIG. 8 is a flowchart illustrating an operation of a coordinate function performed during a process of selecting a final state combination for an application program according to an example embodiment. Referring to FIG. 8, the execution flow of the coordinate function, which implements the logic for the coordination between the applications, is illustrated.

The partitioning apparatus may select a final state combination by selecting a combination with a smallest core count, based on a core count allocated to the most robust application program.

The partitioning apparatus may iterate the coordination in the candidate state list of the application program which is sorted in the order of tolerance against the performance anomalies of TP. If an application program is tolerant against the performance anomalies of TP, it is possible to achieve the high performance even if the core count allocated to the application program is not a divisor of the thread count of the corresponding application program.

The partitioning apparatus may find a feasible state of the application program that requires the minimum core count and attempt to resolve the core oversubscription issue that the total core count requested by the new state combination is greater than the total core count $N_C$ of the system, by reclaiming the corresponding number of cores from the application program. If the partitioning apparatus fails to resolve the core oversubscription issue, the partitioning apparatus may perform the exit sub-phase 760 described above.

Figure 9:
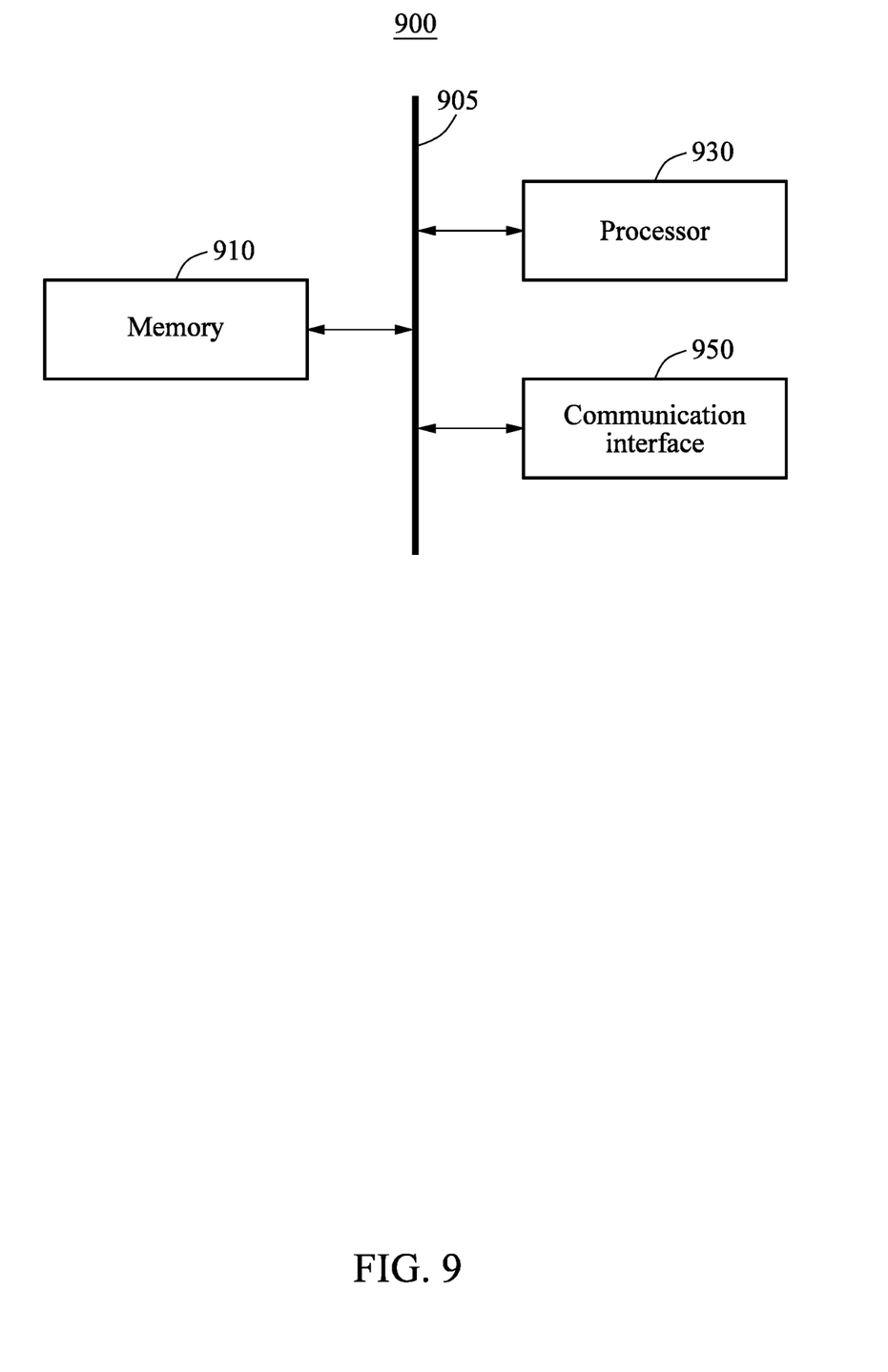
FIG. 9 is a diagram illustrating an apparatus for managing a memory of a system according to an example embodiment.

FIG. 9 is a diagram illustrating an apparatus for managing a memory of a system according to an example embodiment. Referring to FIG. 9, a partitioning apparatus 900 may include a memory 910 and a processor 930. The partitioning apparatus 900 may further include a communication interface 950. The memory 910, the processor 930 and the communication interface 950 may communicate with each other through a communication bus 905.

The processor 930 may determine state combinations of techniques for partitioning memory bandwidth of the system based on at least one application program executed on cores of the system. The processor 930 may determine candidate state combinations corresponding to characteristics of the application program, among the state combinations, by profiling the application program based on the state combinations. The processor 930 may select a final state combination for the application program by exploring a state space of the system corresponding to the candidate state combinations. The processor 930 may partition the memory bandwidth of the system based on the final state combination. The memory bandwidth partitioning techniques may include, for example, TP, CM, and MBA. In this example, the state combinations may include states respectively corresponding to the memory bandwidth partitioning techniques, and a state combination which lowers a usage of the memory bandwidth of the system to be less than a preset standard. The processor 930 may determine the state combinations based on a memory bandwidth budget for a predetermined application program.

In addition, the processor 930 may perform any one or any combination of the operations described with respect to the partitioning apparatus with reference to FIGS. 1 through 8.

Program codes to be executed by the processor 930 may be stored in the memory 910.

The memory 910 may store an application program and information related to the application program. The memory 910 may be a volatile memory or a non-volatile memory. The memory 910 may store instructions that, when executed by the processor 930, cause the processor 930 to perform any one or any combinations of the processes described with reference to FIGS. 1 through 7.

The communication interface 950 may receive the memory bandwidth budget for the predetermined application program.

According to example embodiments, it is possible to provide a hybrid technique that may dynamically partition memory bandwidth based on characteristics of an application program on a commodity server without requiring any offline profiling, based on a plurality of memory bandwidth partitioning techniques.

According to example embodiments, it is possible to present in-depth characterization of the widely used software and hardware techniques for memory bandwidth partitioning in terms of dynamic range, granularity, and efficiency.

According to example embodiments, it is possible to achieve high efficiency and optimization of memory bandwidth partitioning by dynamically analyzing characteristics of target application programs, without requiring any per-application program offline data.

According to example embodiments, it is possible to implement a hybrid technique for partitioning memory bandwidth, requiring not modifications to the underlying operating systems.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (for example, USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of partitioning memory bandwidth of a system, the method comprising:
   determining state combinations of a application program using techniques for partitioning the memory bandwidth of the system based on at least one application program executed on cores of the system, wherein the state combinations comprising the number of cores allocated to the application program and setting values according to the techniques;
   determining candidate state combinations corresponding to characteristics of the application program, among the state combinations of the application program, by profiling the application program based on the state combinations;
   selecting a final state combination for the application program by exploring a state space of the system corresponding to the candidate state combinations; and
   partitioning the memory bandwidth of the system based on the final state combination,
   wherein the determining of the state combinations comprises determining the state combinations for the number of the cores to set a duty cycle to a second level according to CM and set an allocated bandwidth to a first level according to MBA, for the number of the cores, based on the memory bandwidth budget for a predetermined application program.

2. The method of claim 1, wherein the techniques include at least one of thread packing (TP), clock modulation (CM), and memory bandwidth allocation (MBA).

3. The method of claim 1, wherein the state combinations include states respectively corresponding to the techniques, and a state combination which lowers a usage of the memory bandwidth of the system to be less than a preset standard.

4. The method of claim 1, wherein the determining of the candidate state combinations comprises determining the candidate state combinations corresponding to the characteristics of the application program by removing a portion of the state combinations based on the profiling.

5. The method of claim 1, wherein the determining of the candidate state combinations comprises:
   determining whether a performance degradation occurs when a core count allocated to the application program is not a divisor of a thread count of the application program according to TP, by dynamically profiling the application program based on the state combinations; and
   eliminating a state in which the core count allocated to the application program is not the divisor of the thread count of the application program from the state combinations, when the performance degradation occurs.

6. The method of claim 5, wherein the determining of whether the performance degradation occurs comprises:
   profiling the application program in parallel by allocating the core count which is not the divisor of the thread count of the application program; and
   determining whether the performance degradation occurs based on a result of the profiling in parallel.

7. The method of claim 1, wherein the selecting comprises:
   determining a final state of the system by comparing an efficiency of a previous state of the system and an efficiency of a current state of the system in the state space of the system; and
   selecting the final state combination based on a result of comparing the candidate state combinations in the previous state and the current state for the application program, based on the final state of the system.

8. The method of claim 7, wherein the selecting further comprises sorting the candidate state combinations, and
   wherein the determining of the final state of the system comprises determining the final state of the system by comparing the efficiency of the previous state of the system and the efficiency of the current state of the system in the state space of the system based on the sorted candidate state combinations.

9. The method of claim 8, wherein the sorting comprises sorting the candidate state combinations based on a computation capacity of the candidate state combinations.

10. The method of claim 7, wherein the selecting of the final state combination comprises:
    generating a new state combination based on a result of comparing the candidate state combinations; and determining the new state combination to be the final state combination based on whether the new state combination satisfies the number of the cores of the system.

11. The method of claim 1, wherein the selecting of the final state combination comprises:
exploring the state space of the system periodically using a preset search algorithm; and
selecting a candidate state combination satisfying a condition predesignated by a user for the application program from among the candidate state combinations, as the final state combination based on a result of the exploring.

12. The method of claim 11, wherein the condition predesignated by the user includes whether a metric defined by the user is satisfied.

13. The method of claim 1, further comprising:
monitoring at least one of a termination of the application program, and a memory bandwidth budget for an application program for executing the application program.

14. A non-transitory computer-readable storage medium storing instructions that, when executed by a processor, cause the processor to perform the method of claim 1.

15. An apparatus for partitioning memory bandwidth of a system, the apparatus comprising:
a memory; and
a processor,
wherein the processor is configured to:
determine state combinations of a application program using techniques for partitioning the memory bandwidth of the system based on at least one application program executed on cores of the system, wherein the state combinations comprising the number of cores allocated to the application program and setting values according to the techniques,
determine candidate state combinations corresponding to characteristics of the application program, among the state combinations of the application program, by profiling the application program based on the state combinations,
select a final state combination for the application program by exploring a state space of the system corresponding to the candidate state combinations, and
partition the memory bandwidth of the system based on the final state combination,
wherein the processor is configured to determine the state combinations for the number of the cores to set a duty cycle to a second level according to CM and set an allocated bandwidth to a first level according to MBA, for the number of the cores, based on the memory bandwidth budget for a predetermined application program.

16. The apparatus of claim 15, wherein the techniques include at least one of thread packing (TP), clock modulation (CM), and memory bandwidth allocation (MBA).

17. The apparatus of claim 15, wherein the state combinations include states respectively corresponding to the techniques, and a state combination which lowers a usage of the memory bandwidth of the system to be less than a preset standard.

18. The apparatus of claim 15, wherein the processor is configured to determine the candidate state combinations corresponding to the characteristics of the application program by removing a portion of the state combinations based on the profiling.

19. The apparatus of claim 15, wherein the processor is configured to:
determine whether a performance degradation occurs when a core count allocated to the application program is not a divisor of a thread count of the application program according to TP, by dynamically profiling the application program based on the state combinations, and
eliminate a state in which the core count allocated to the application program is not the divisor of the thread count of the application program from the state combinations, when the performance degradation occurs.

20. The apparatus of claim 19, wherein the processor is configured to:
profile the application program in parallel by allocating the core count which is not the divisor of the thread count of the application program, and
determine whether the performance degradation occurs based on a result of the profiling in parallel.

21. The apparatus of claim 15, wherein the processor is configured to:
sort the candidate state combinations,
determine a final state of the system by comparing an efficiency of a previous state of the system and an efficiency of a current state of the system in the state space of the system based on the sorted candidate state combinations, and
select the final state combination based on a result of comparing the candidate state combinations in the previous state and the current state for the application program, based on the final state of the system.

22. The apparatus of claim 21, wherein the processor is configured to sort the candidate state combinations based on a computation capacity of the candidate state combinations.

23. The apparatus of claim 21, wherein the processor is configured to:
generate a new state combination based on a result of comparing the candidate state combinations, and
determine the new state combination to be the final state combination based on whether the new state combination satisfies the number of the cores of the system.

24. The apparatus of claim 15, wherein the processor is configured to:
explore the state space of the system periodically using a preset search algorithm, and
select a candidate state combination satisfying a condition predesignated by a user for the application program from among the candidate state combinations, as the final state combination based on a result of the exploring, and
wherein the condition predesignated by the user includes whether a metric defined by the user is satisfied.

* * * * *